(12) United States Patent
Aota

(10) Patent No.: US 7,358,853 B2
(45) Date of Patent: Apr. 15, 2008

(54) CRIME PREVENTION ASSISTING APPARATUS AND RADIO TERMINAL APPARATUS

(75) Inventor: Masahiro Aota, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/029,243

(22) Filed: Jan. 4, 2005

(65) Prior Publication Data
US 2005/0128075 A1  Jun. 16, 2005

Related U.S. Application Data

(63) Continuation of application No. PCT/JP02/06787, filed on Jul. 4, 2002.

(51) Int. Cl.
*G08B 1/08* (2006.01)

(52) U.S. Cl. ............... 340/539.1; 340/506; 340/425.5; 455/404.1

(58) Field of Classification Search ........... 340/539.1, 340/506, 425.5, 426.1, 426.2, 531, 426.21; 455/404, 404.1; 307/10.2, 10.3
See application file for complete search history.

(56) References Cited

U.S. PATENT DOCUMENTS

| | | | | |
|---|---|---|---|---|
| 6,127,924 A | * | 10/2000 | Hung | ............. 340/7.1 |
| 6,262,655 B1 | * | 7/2001 | Yoshioka et al. | ......... 340/425.5 |
| 6,337,621 B1 | | 1/2002 | Ogino et al. | |
| 6,359,570 B1 | * | 3/2002 | Adcox et al. | ............. 340/902 |
| 6,862,443 B2 | * | 3/2005 | Witte | ........... 455/345 |
| 2002/0037707 A1 | | 3/2002 | Yoshioka et al. | |

FOREIGN PATENT DOCUMENTS

| | | |
|---|---|---|
| DE | 10137689 | 4/2002 |
| JP | 08-317475 | 11/1996 |
| JP | 09249095 | 9/1997 |
| JP | 11-341567 | 12/1999 |
| JP | 2000-52932 | 2/2000 |
| JP | 2000123272 | 4/2000 |
| JP | 2000-196718 | 7/2000 |
| JP | 2000-322678 | 11/2000 |
| JP | 2001292252 | 10/2001 |
| JP | 2002-117472 | 4/2002 |
| JP | 2002-152839 | 5/2002 |
| JP | 2002-160606 | 6/2002 |
| WO | WO 01/78032 A1 * | 10/2001 |

OTHER PUBLICATIONS

International Search Report dated Oct. 22, 2002.
Partial translation of Japanese Office Action, dated Nov. 20, 2007, for the corresponding Japanese patent Application JP 2004-519178.
Japanese Office Action without translation, dated Nov. 20, 2007, for the corresponding Japanese Patent Application JP 2004-519178.

* cited by examiner

*Primary Examiner*—Anh V. La
(74) *Attorney, Agent, or Firm*—Katten Muchin Rosenman LLP

(57) ABSTRACT

The invention relates to a crime prevention assisting apparatus which can work with a radio terminal apparatus manipulated by a subscriber or the like of a mobile communication system in order to prevent crime as well as to a radio terminal apparatus that has a function of crime prevention and is used for providing a communication service to the subscriber. An object of the invention is to utilize existing hardware effectively and to prevent crime at a low cost. The apparatuses according to the invention make a transition to a special state when a particular event has occurred, and issue only in the special state an alarm to the effect that a crime prevent measure is taken, and originates a call automatically in response to a prescribed manipulation or requests a radio terminal apparatus to originate a call.

9 Claims, 8 Drawing Sheets

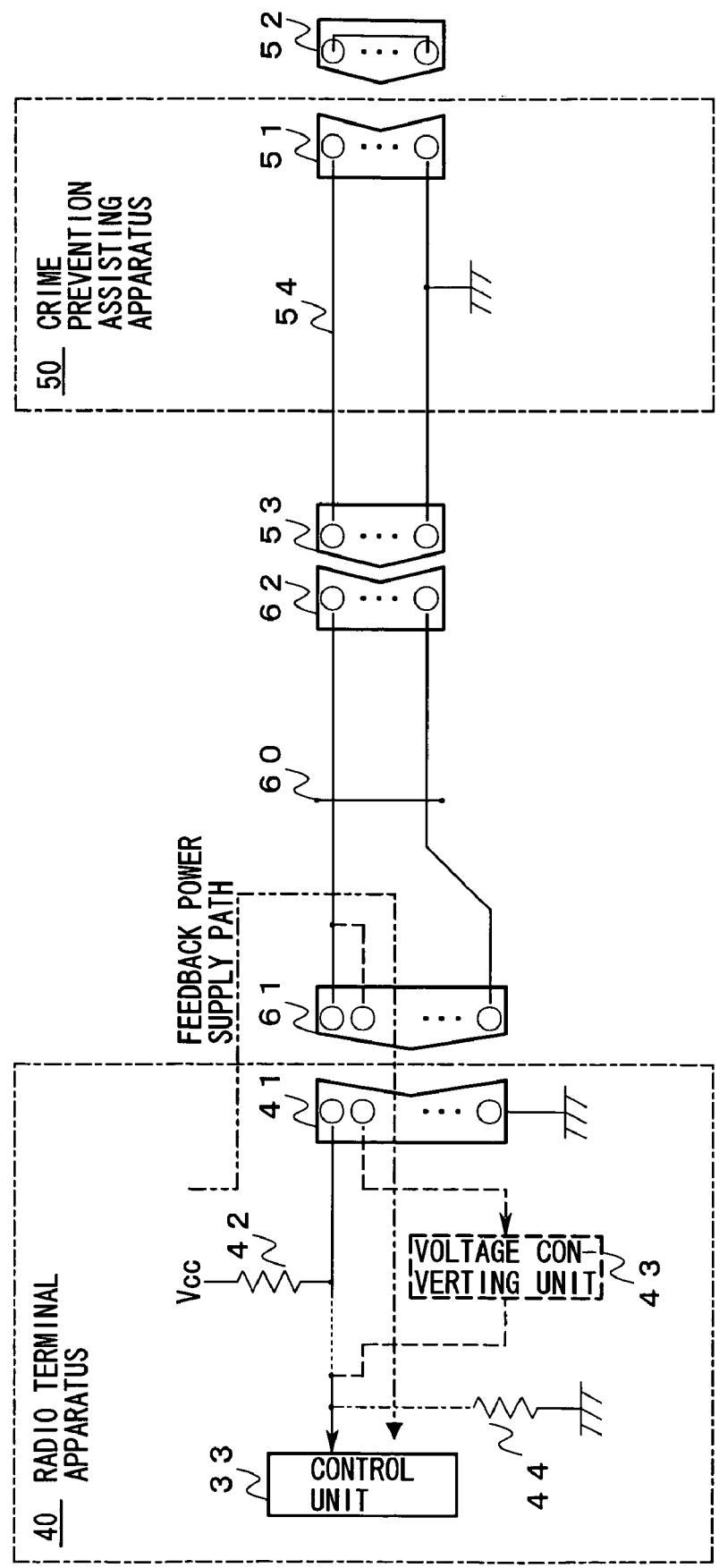

CRIME PREVENTION ASSISTING APPARATUS AND RADIO TERMINAL APPARATUS

CROSS-REFERENCE TO RELATED APPLICATION

This is application is a continuation application of International Application PCT/JP2002/006787, filed Jul. 4, 2002, and designating the U.S., the contents of which are incorporated by reference.

BACKGROUND OF THE INVENTION

1. Field of the Invention

The present invention relates to a crime prevention assisting apparatus that utilizes a radio terminal apparatus of a mobile communication system for prevention of a crime against a subscriber who manipulates the radio terminal apparatus, as well as to a radio terminal apparatus that has a function relating to such crime prevention and is used for providing a communication service to its subscriber.

2. Description of the Related Art

In recent years, the number of subscribers of mobile communication systems have increased rapidly because of the deregulation of the market and the competition among communication equipment manufacturers and communication companies. And, radio terminal apparatus having a variety of added values have come to be put into practical use one after another.

Among those conventional radio terminal apparatus, examples of radio terminal apparatus that have, as such added value, a function of coping with an event that a manipulator encounters a certain accident or is involved in a crime are as follows:

Radio terminal apparatus that has a crime prevention buzzer function, is equipped with, behind a mirror surface portion, a button that enables activation of the crime prevention buzzer, and blows a siren or generates a like sound upon depression of the button (disclosed in Japanese Unexamined Patent Application Publication No. 2000-196718).

Radio terminal apparatus that has a navigation function and automatically informs a police station or a fire station of its own position obtained by the navigation function upon depression of a No. 110 button or a No. 119 button provided in the main body (disclosed in Japanese Unexamined Patent Application Publication No. 2000-322678).

Radio terminal apparatus that, when a prescribed manipulation is performed thereon, originates a call automatically and issues an alarm about occurrence of an abnormal state by sounding a crime prevention alarm (disclosed in Japanese Unexamined Patent Application Publication No. Hei 11-341567).

Incidentally, the above conventional apparatus do not have, at all, a function of preventing a crime itself though they can minimize damage that is caused to a manipulator when he or she encounters an accident or is involved in a crime or can avoid expansion of such damage.

The hardware that is inherently provided in portable terminals of the above kind cannot make the level of the above-mentioned siren or crime prevention alarm sufficiently high though in many cases damage is caused to a manipulator of a radio terminal apparatus by a crime in a state that there is no one around him or her.

Further, to generate such a siren or crime prevention alarm at a sufficiently high level, it is necessary that a portable terminal be equipped with a sound generating body having a wide dynamic range and a battery capable of supplying sufficient power to drive the sound generating body.

Therefore, in practice, it is difficult to generate such a siren or crime prevention alarm at a sufficiently high level because of strict requirements for cost reduction, miniaturization, and power saving.

SUMMARY OF THE INVENTION

An object of the present invention is to provide a crime prevention assisting apparatus and a radio terminal apparatus that can work with hardware provided in a portable terminal and to prevent crime at a low cost.

Another object of the invention is to prevent crime reliably at a low cost and enhance the added values of a mobile communication system and a terminal without failing to satisfy strong demand for cost reduction, miniaturization, and power saving on the terminal.

Another object of the invention is to utilize resources provided in a radio terminal apparatus for crime prevention with high reliability.

Another object of the invention is to increase the quality of a security service and to reduce the total cost.

Another object of the invention is to increase the manipulability and convenience of the apparatuses of the invention for crime prevention.

Still another object of the invention is to prevent crime against a variety of subjects with high reliability.

Another object of the invention is to prevent undue increase in load and power consumption of the apparatuses of the invention without lowering the reliability of crime prevention and the manipulability and convenience thereof.

Another object of the invention is to more quickly help a manipulator of a radio terminal apparatus.

Another object of the invention is to increase the reliability and quickness of help to come.

Yet another object of the invention is to reliably investigate and understand the background of the call origination with the increased reliability and quickness of help to come.

Another object of the invention is to investigate and understand the background and cause of the above-mentioned call origination in detail according to received information.

Another object of the invention is to ensure that the above received information is reflected in an investigation and understanding of the above-mentioned background and cause of the call origination.

Another object of the invention is to have such information to be reflected in the investigation and understanding of the background and cause of the call origination with sureness.

Another object of the invention is to understand and investigate the background and cause of the call origination efficiently and reliably.

Another object of the invention is to prevent crime at a higher rate and minimize the damage to the victim of the crime.

Another object of the invention is to utilize resources provided in a radio terminal apparatus for crime prevention effectively with high reliability.

A further object of the invention is to transmit an alarm issued from a man-machine interface section and the crime prevention assisting apparatus to many people in parallel and thereby prevent crime at a higher rate.

The above objects are attained by a crime prevention assisting apparatus characterized in that a transition is made to a special state upon occurrence of a particular event, an alarm to the effect that a crime prevention measure is taken only in the special state is issued, and in response to a prescribed manipulation performed through a man-machine interface section a radio terminal apparatus is requested to make call origination.

Such an alarm is recognized parallel by many people without being interrupted by a manipulator of the radio terminal apparatus or his or her personal belongings, whereby the reliability of crime prevention by the alarm is kept high. Further, in an emergency in which certain damage has been caused or may be caused in spite of the issuance of such an alarm, the above-mentioned call origination is effected by a prescribed manipulation that is not performed in an ordinary state.

The above objects are attained by a crime prevention assisting apparatus characterized in that when a transition is made to the special state a notice to that effect is sent to a prescribed communication apparatus via the mobile communication network, and by a radio terminal apparatus characterized in sending such a notice directly.

Such a notice can be used as basic information for, for example, grasping the presence and the total number of radio terminal apparatus that are prepared for a crime by making a transition to the above-mentioned special state and to which a prescribed service relating to security should be provided.

The above objects are attained by a crime prevention assisting apparatus and a radio terminal apparatus that are characterized in that the particular event is when time belongs to a preset time slot.

In these crime prevention assisting apparatus and radio terminal apparatus, time for a transition to the above-mentioned special state is given automatically and reliably without any further special manipulation of the manipulator as long as the above-mentioned time slot is set in advance.

The above objects are attained by a crime prevention assisting apparatus and a radio terminal apparatus that are characterized in that the particular event is when a value of binary information that is supplied externally is a particular value.

In these crime prevention assisting apparatus and radio terminal apparatus, time for a transition to the above-mentioned special state is given reliably as entrance into a period or a state in which preparation for a crime against not only the manipulator but also a variety of subjects should be made effective as long as hardware or like resources for setting the above-mentioned binary information at the particular value are provided.

The above objects are attained by a crime prevention assisting apparatus and a radio terminal apparatus that are characterized in that the particular event is that the position determined by positioning section belongs to a preset area.

In these crime prevention assisting apparatus and radio terminal apparatus, time for a transition to the above-mentioned special state is given automatically and reliably without any further special manipulation of the manipulator as long as the above-mentioned area is set in advance.

The above objects are attained by a crime prevention assisting apparatus and a radio terminal apparatus that are characterized in that the particular event is that time and a position determined by positioning section belong to a preset period and a preset area, respectively.

In these crime prevention assisting apparatus and radio terminal apparatus, time for a transition to the above-mentioned special state is given automatically and reliably without any further special manipulation of the manipulator as long as the above-mentioned period and area are set in advance.

The above objects are attained by a crime prevention assisting apparatus characterized in that the position is acquired upon occurrence of the particular event, and the radio terminal apparatus is requested to inform, of the position, a called party of a complete call that occurs as a result of the call origination.

In this crime prevention assisting apparatus, when the above-mentioned call origination is made in an emergency in which certain damage has been caused or may be caused, a position of the radio terminal apparatus at a time point when the radio terminal apparatus made a transition to the above-mentioned special state is sent automatically.

The above objects are attained by a crime prevention assisting apparatus characterized in that the radio terminal apparatus is requested to inform, of a position at a time point of the call origination, a called party of a complete call that occurs as a result of the call origination, and by a radio terminal apparatus characterized in sending a notice of such a position directly.

In these crime prevention assisting apparatus and radio terminal apparatus, when the above-mentioned call origination is made in an emergency in which certain damage has been caused or may be caused, a position of the radio terminal apparatus at that time point is sent automatically.

The above objects are attained by a crime prevention assisting apparatus characterized in that the radio terminal apparatus is requested to send an identifier of the station concerned or a subscriber and information meaning a request for help to a called party of a complete call that occurs as a result of the call origination, and by a radio terminal apparatus characterized in sending such information directly.

In these crime prevention assisting apparatus and radio terminal apparatus, when the above-mentioned call origination is made in an emergency in which certain damage has been caused or may be caused, information that is effective for quick determination of the background of the call origination and the radio terminal apparatus as a subject of help can be sent automatically even if the manipulator is rendered in such a situation as to be unable to make a call.

The above objects are attained by a crime prevention assisting apparatus characterized in that a log relating to the man-machine interfacing is acquired, and the radio terminal apparatus is requested to inform, of the log, a called party of a complete call that occurs as a result of the call origination, and by a radio terminal apparatus characterized in sending such a log directly.

In these crime prevention assisting apparatus and radio terminal apparatus, when the above-mentioned call origination is made in an emergency in which certain damage has been caused or may be caused, one or both of a history of manipulations that were performed by the manipulator in advance and a message that was input by the manipulator are sent automatically.

The above objects are attained by a crime prevention assisting apparatus and a radio terminal apparatus characterized in that information that is supplied via the man-machine interface section at the time of the call origination is acquired and held.

In these crime prevention assisting apparatus and radio terminal apparatus, information that is input by the manipulator when the above-mentioned call origination is made in an emergency in which certain damage has been caused or may be caused is held automatically.

The above objects are attained by a crime prevention assisting apparatus and a radio terminal apparatus characterized in that pieces of information are acquired via the man-machine interface section and information is held that was acquired immediately before the radio terminal apparatus is requested to make the call origination among the pieces of information.

In these crime prevention assisting apparatus and radio terminal apparatus, information that was input by the manipulator before the above-mentioned call origination is made in an emergency in which certain damage has been caused or may be caused is held automatically.

The above objects are attained by a crime prevention assisting apparatus characterized in that the radio terminal apparatus is requested to send, to a called party of a complete call that occurs as a result of the call origination, information that was acquired immediately before the call origination among pieces of information that are input via the man-machine interface section, and by a radio terminal apparatus characterized in sending such information directly.

In these crime prevention assisting apparatus and radio terminal apparatus, information that was input by the manipulator before the call origination is made in an emergency in which certain damage has been caused or may be caused is sent automatically.

The above objects are attained by a crime prevention assisting apparatus characterized in that information that is input via the man-machine interface section at the time of the call origination is acquired, and the radio terminal apparatus is requested to send the acquired information to a called party of a complete call that occurs as a result of the call origination, and by a radio terminal apparatus characterized in sending such information directly.

In these crime prevention assisting apparatus and radio terminal apparatus, information that is input by the manipulator when the call origination is made in an emergency in which certain damage has been caused or may be caused is sent automatically.

The above objects are attained by a crime prevention assisting apparatus and a radio terminal apparatus characterized in that information that should be sent to the called party is sent as a mail.

In these crime prevention assisting apparatus and radio terminal apparatus, information to be used for an investigation and understanding of the background and cause of the above-mentioned call origination is transmitted to a destination even in a state that the destination cannot respond or a connection-type communication channel cannot be established between the radio terminal apparatus and the destination for a certain reason.

The above objects are attained by a crime prevention assisting apparatus and a radio terminal apparatus characterized in that processing of sending the information to the called party is performed with a higher priority given to it than processing relating to the man-machine interfacing.

In these crime prevention assisting apparatus and radio terminal apparatus, even if any manipulation is performed through the man-machine interface section, the transmission of information to be used for an investigation and understanding of the background and cause of the above-mentioned call origination is completed before a response is made to the manipulation.

The above objects are attained by a crime prevention assisting apparatus and a radio terminal apparatus characterized in that information that is acquired via the man-machine interface section is one or both of a sound and an image.

In these crime prevention assisting apparatus and radio terminal apparatus, the background and cause of the above-mentioned call origination is acquired as an actual sound and/or image.

The above objects are attained by a crime prevention assisting apparatus and a radio terminal apparatus characterized in that a complete call that has occurred as a result of the call origination is maintained in a hands-free mode.

In these crime prevention assisting apparatus and radio terminal apparatus, information to be used for an investigation and understanding of the above-mentioned background and cause can be acquired with high reliability and a person who is committing a crime is urged to leave the site earlier as the level of a received speech sound is set higher.

The above objects are attained by a radio terminal apparatus characterized in that a transition is made to a special state upon occurrence of a particular event, an alarm to the effect that a crime prevention measure is taken only in the special state is issued, and call origination is made automatically in response to a prescribed manipulation.

Such an alarm is recognized parallel by many people and crime prevention by the alarm is attained without any basic changes in hardware configuration. Further, in an emergency in which certain damage has been caused or may be caused in spite of the issuance of such an alarm, the above-mentioned call origination is effected by a prescribed manipulation that is not performed in an ordinary state.

The above objects are attained by a radio terminal apparatus characterized in that particular portions of the control section and the man-machine interface section are configured so as to be detachable from the radio terminal apparatus according to the invention and processing unique to the invention is performed by those portions.

In this radio terminal apparatus, the above-mentioned particular portions operate in the same manner as in the above-mentioned first crime prevention assisting apparatus.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 8 shows a second embodiment of the invention.

DESCRIPTION OF THE PREFERRED EMBODIMENTS

First, the principles of operation of crime prevention assisting apparatus according to the present invention will be described.

Figure 1:
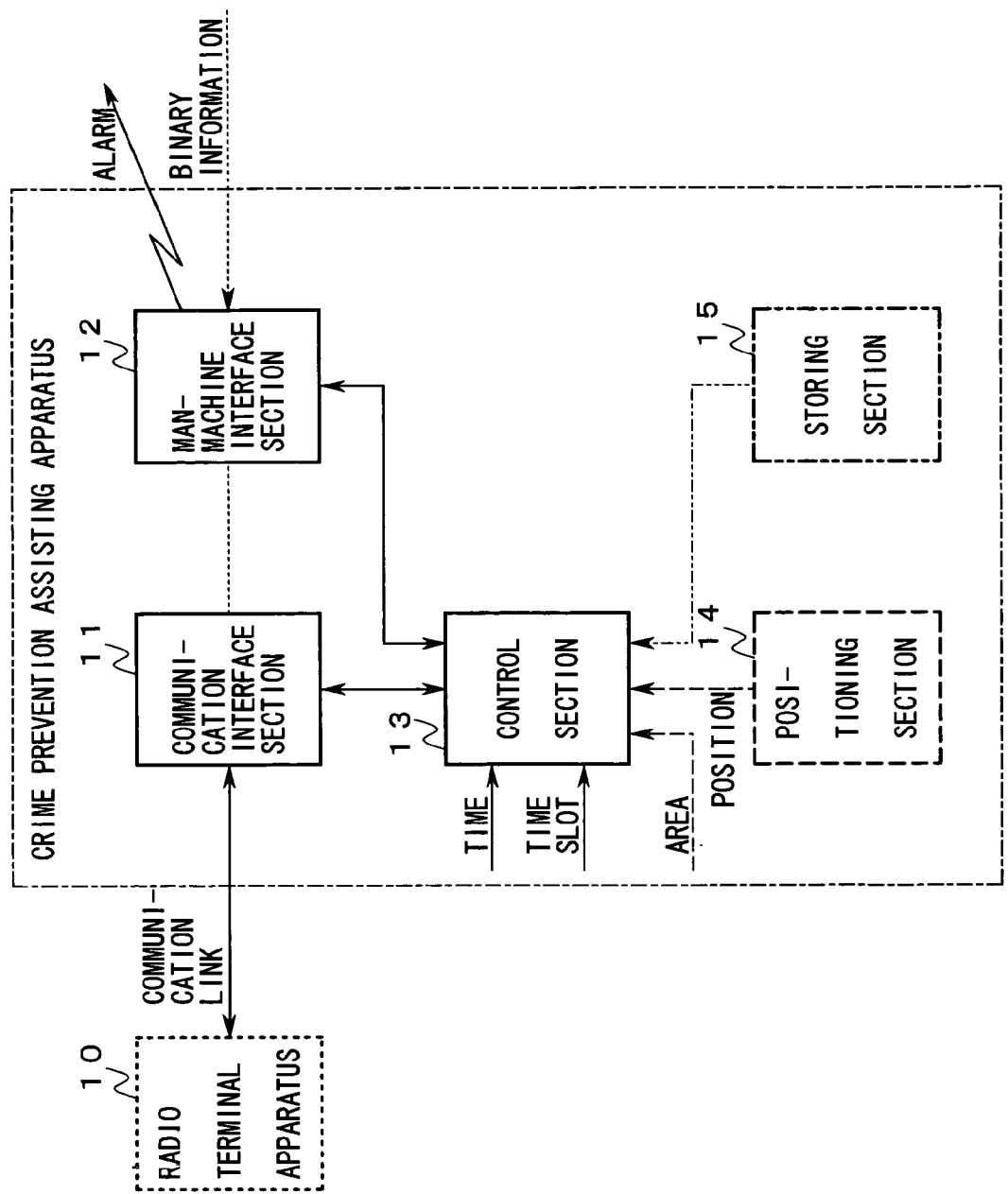
FIG. 1 is a block diagram showing the principles of operation of crime prevention assisting apparatus according to the present invention.

FIG. 1 is a block diagram showing the principles of operation of the crime prevention assisting apparatus according to the invention.

The crime prevention assisting apparatus shown in FIG. 1 are composed of a communication interface section 11, a man-machine interface section 12, a control section 13, a positioning section 14, and a storing section 15.

The principle of operation of a first crime prevention assisting apparatus according to the invention is as follows.

The communication interface section 11 forms a communication link between itself and a radio terminal apparatus 10 accommodated by a mobile communication network. The man-machine interface section 12 assists man-machine interfacing that is performed in the radio terminal apparatus 10. The control section 13, which cooperates with the radio terminal apparatus 10 via the communication interface section 12, causes the radio terminal apparatus 10 to make a transition to a special state upon occurrence of a particular event, issues, via the communication interface section 12, an alarm to the effect that a crime prevention measure is taken only in the special state, and requests, in response to a prescribed manipulation performed through the man-machine interface section 12, the radio terminal apparatus 10 to make call origination.

Issued directly from the crime prevention assisting apparatus according to the invention that is separate from the above-mentioned radio terminal apparatus, such an alarm is recognized parallel by many people without being interrupted by a manipulator of the radio terminal apparatus or his or her personal belongings, whereby the reliability of crime prevention by the alarm is kept high. Further, in an emergency in which certain damage has been caused or may be caused in spite of the issuance of such an alarm, the above-mentioned call origination is effected by a prescribed manipulation that is not performed in an ordinary state.

Therefore, resources provided in the radio terminal apparatus can be utilized for crime prevention effectively with high reliability.

The principle of operation of a second crime prevention assisting apparatus according to the invention is as follows.

When the radio terminal apparatus 10 has made a transition to the special state, the control section 13 requests the radio terminal apparatus 10 to send a notice to that effect to a prescribed communication apparatus via the mobile communication network.

Such a notice can be used as basic information for, for example, grasping the presence and the total number of radio terminal apparatus that are prepared for a crime by making a transition to the above-mentioned special state and to which a prescribed service relating to security should be provided.

This enables increase in the total quality of such a service and cost reduction.

The principle of operation of a third crime prevention assisting apparatus according to the invention is as follows.

The particular event to be recognized by the control section 13 is that time belongs to a preset time slot.

That is, time for the radio terminal apparatus 10 to make a transition to the special state in which the above-mentioned alarm for realizing crime prevention is issued and that enables call origination in an emergency in which certain damage has been caused or may be caused is given automatically and reliably without any further special manipulation of the manipulator as long as the above-mentioned time slot is set in advance.

This increases the reliability of crime prevention as well as the ease of manipulation and the convenience.

The principle of operation of a fourth crime prevention assisting apparatus according to the invention is as follows.

The particular event to be recognized by the control section 13 is that a value of binary information that is supplied externally via the man-machine interface section 12 is a particular value.

That is, time for the radio terminal apparatus 10 to make a transition to the special state in which the above-mentioned alarm is issued and that enables call origination in an emergency in which certain damage has been caused or may be caused is given reliably as entrance into a period or a state in which preparation for a crime against not only the manipulator but also a variety of subjects should be made effective as long as hardware or like resources for setting the above-mentioned binary information at the particular value are provided and operate reliably.

This makes it possible to attain crime prevention for a variety of subjects reliably.

The principle of operation of a fifth crime prevention assisting apparatus according to the invention is as follows.

The positioning section 14 determines a position of a local station. The particular event to be recognized by the control section 13 is that the position determined by the positioning section 14 belongs to a preset area.

That is, time for the radio terminal apparatus 10 to make a transition to the special state in which the above-mentioned alarm for realizing crime prevention is issued and that enables call origination in an emergency in which certain damage has been caused or may be caused is given automatically and reliably without any further special manipulation of the manipulator as long as the above-mentioned area is set in advance.

This increases the reliability of crime prevention as well as the ease of manipulation and the convenience.

The principle of operation of a sixth crime prevention assisting apparatus according to the invention is as follows.

The particular event to be recognized by the control section 13 is that time and a position determined by the positioning section 14 provided in the radio terminal apparatus belong to a preset period and a preset area, respectively.

That is, time for the control section 13 to make a transition to the special state in which the above-mentioned alarm for realizing crime prevention is issued and that enables call origination in an emergency in which certain damage has been caused or may be caused is given automatically and reliably without any further special manipulation of the manipulator as long as the above-mentioned period and area are set in advance.

This makes the reliability of crime prevention, the ease of manipulation, and the convenience higher or greater than in the case where such time is given on the basis of only the preset area, and prevents undue increase in the load and power consumption of the control unit 13.

The principle of operation of a seventh crime prevention assisting apparatus according to the invention is as follows.

The control section 13 acquires the position upon occurrence of the particular event, and requests the radio terminal apparatus 10 to inform, of the position, a called party of a complete call that occurs as a result of the call origination.

That is, when the above-mentioned call origination is made in an emergency in which certain damage has been caused or may be caused, a position of the radio terminal apparatus 10 at a time point when the radio terminal apparatus 10 made a transition to the above-mentioned special state is sent automatically.

This enables quick help to the manipulator of the radio terminal apparatus 10.

The principle of operation of an eighth crime prevention assisting apparatus according to the invention is as follows.

The control section 13 acquires a position that is determined by the positioning section 14 at a time point of the request to the ratio terminal apparatus 10 for the call origination, and requests the radio terminal apparatus 10 to inform, of the position, a called party of a complete call that occurs as a result of the call origination.

That is, when the above-mentioned call origination is made in an emergency in which certain damage has been caused or may be caused, a position of the radio terminal apparatus 10 at a time point when the radio terminal apparatus 10 made a transition to the above-mentioned special state is sent automatically.

This enables quicker help to the manipulator of the radio terminal apparatus 10.

The principle of operation of a ninth crime prevention assisting apparatus according to the invention is as follows.

An identifier of the radio terminal apparatus 10 or a subscriber and information meaning a request for help are stored in the storing section 15 in advance. The control section 13 requests the radio terminal apparatus 10 to send the information stored in the storing section 15 to a called party of a complete call that occurs as a result of the call origination.

That is, when the above-mentioned call origination is made in an emergency in which certain damage has been caused or may be caused, information that is effective for quick determination of the background of the call origination and the radio terminal apparatus 10 as a subject of help can be sent automatically even if the manipulator is rendered in such a situation as to be unable to make a call.

This increases the reliability and quickness of help to the manipulator of the radio terminal apparatus 10.

The principle of operation of a 10th crime prevention assisting apparatus according to the invention is as follows.

The control section 13 acquires a log relating to the man-machine interfacing, and requests the radio terminal apparatus 10 to inform, of the log, a called party of a complete call that occurs as a result of the call origination.

That is, when the above-mentioned call origination is made in an emergency in which certain damage has been caused or may be caused, one or both of a history of manipulations that were performed by the manipulator in advance and a message that was input by the manipulator are sent automatically.

This increases the reliability of an investigation and understanding of the background of the above-mentioned call origination as well as the reliability and quickness of help.

The principle of operation of an 11th crime prevention assisting apparatus according to the invention is as follows.

The control section 13 has a readable storage area, and acquires information via the man-machine interface section 12 when the control section 13 requests the radio terminal apparatus 10 to make the call origination and holds the information in the storage area.

That is, information that is input by the manipulator when the above-mentioned call origination is made because certain damage has been caused or may be caused is held automatically.

Therefore, an investigation and understanding of the background of the above-mentioned call origination is performed or attained with high reliability on the basis of the information as long as the crime prevention assisting apparatus according to the invention is recovered and the information is acquired from it.

The principle of operation of a 12th crime prevention assisting apparatus according to the invention is as follows.

The control section 13 has a readable storage area, and acquires pieces of information via the man-machine interface section 12 and holds, in the storage area, latest information that was acquired before the control section 13 requests the radio terminal apparatus 10 to make the call origination among the pieces of information.

That is, information that was input by the manipulator before the call origination is made in an emergency in which certain damage has been caused or may be caused is held automatically.

Therefore, a close investigation and deep understanding of the background of the above-mentioned call origination is performed or attained with high reliability on the basis of the information as long as the crime prevention assisting apparatus according to the invention is recovered and the information is acquired from it.

The principle of operation of a 13th crime prevention assisting apparatus according to the invention is as follows.

The control section 13 acquires pieces of information via the man-machine interface section 12, and requests the radio terminal apparatus 10 to send latest information that was acquired immediately before the call origination among the pieces of information to a called party of a complete call that occurs as a result of the call origination.

That is, information that was input by the manipulator before the call origination is made in an emergency in which certain damage has been caused or may be caused is sent automatically.

This makes it possible to perform or attain a close investigation and deep understanding of the background and cause of the above-mentioned call origination on the basis of the information thus received.

The principle of operation of a 14th crime prevention assisting apparatus according to the invention is as follows.

The control section 13 acquires information via the man-machine interface section 12 upon occurrence of the particular event, and requests the radio terminal apparatus 10 to send the acquired information to a called party of a complete call that occurs as a result of the call origination.

That is, information that is input by the manipulator when the call origination is made in an emergency in which certain damage has been caused or may be caused is sent automatically.

This makes it possible to perform or attain a close investigation and deep understanding of the background and cause of the above-mentioned call origination on the basis of the information thus received.

The principle of operation of a 15th crime prevention assisting apparatus according to the invention is as follows.

The control section 13 requests the radio terminal apparatus 10 to send the information to the called party as a mail.

That is, information to be used for an investigation and understanding of the background and cause of the above-mentioned call origination is transmitted to a destination even in a state that the destination cannot respond or a connection-type communication channel cannot be established between the radio terminal apparatus and the destination for a certain reason.

This ensures with high reliability that such information is reflected in an investigation and understanding of the above-mentioned background and cause.

The principle of operation of a 16th crime prevention assisting apparatus according to the invention is as follows.

The control section 13 performs processing of sending the information to the called party with a higher priority given to it than processing relating to the man-machine interfacing.

That is, even if any manipulation is performed through the man-machine interface section 12, the transmission of information to be used for an investigation and understanding of the background and cause of the above-mentioned call origination is completed before a response is made to the manipulation.

This allows such information to be reflected in an investigation and understanding of the above-mentioned background and cause with high reliability.

The principle of operation of a 17th crime prevention assisting apparatus according to the invention is as follows.

Information that is acquired via the man-machine interface section 12 is one or both of a sound and an image.

That is, the background and cause of the above-mentioned call origination is acquired as an actual sound and/or image.

This makes it possible to perform an investigation and understanding of the background and cause efficiently with high reliability.

The principle of operation of an 18th crime prevention assisting apparatus according to the invention is as follows.

The control section 13 requests the radio terminal apparatus 10 to maintain, in a hands-free mode, a complete call that has occurred as a result of the call origination.

In general, in the hands-free mode, a speech signal is sent and received at a higher level than in an ordinary mode. Therefore, information to be used for an investigation and understanding of the above-mentioned background and cause can be acquired with high reliability and a person who is committing a crime is urged to leave the site earlier as the level of a received speech sound is set higher.

This increases the reliability of crime prevention and minimizes the damage.

Figure 2:
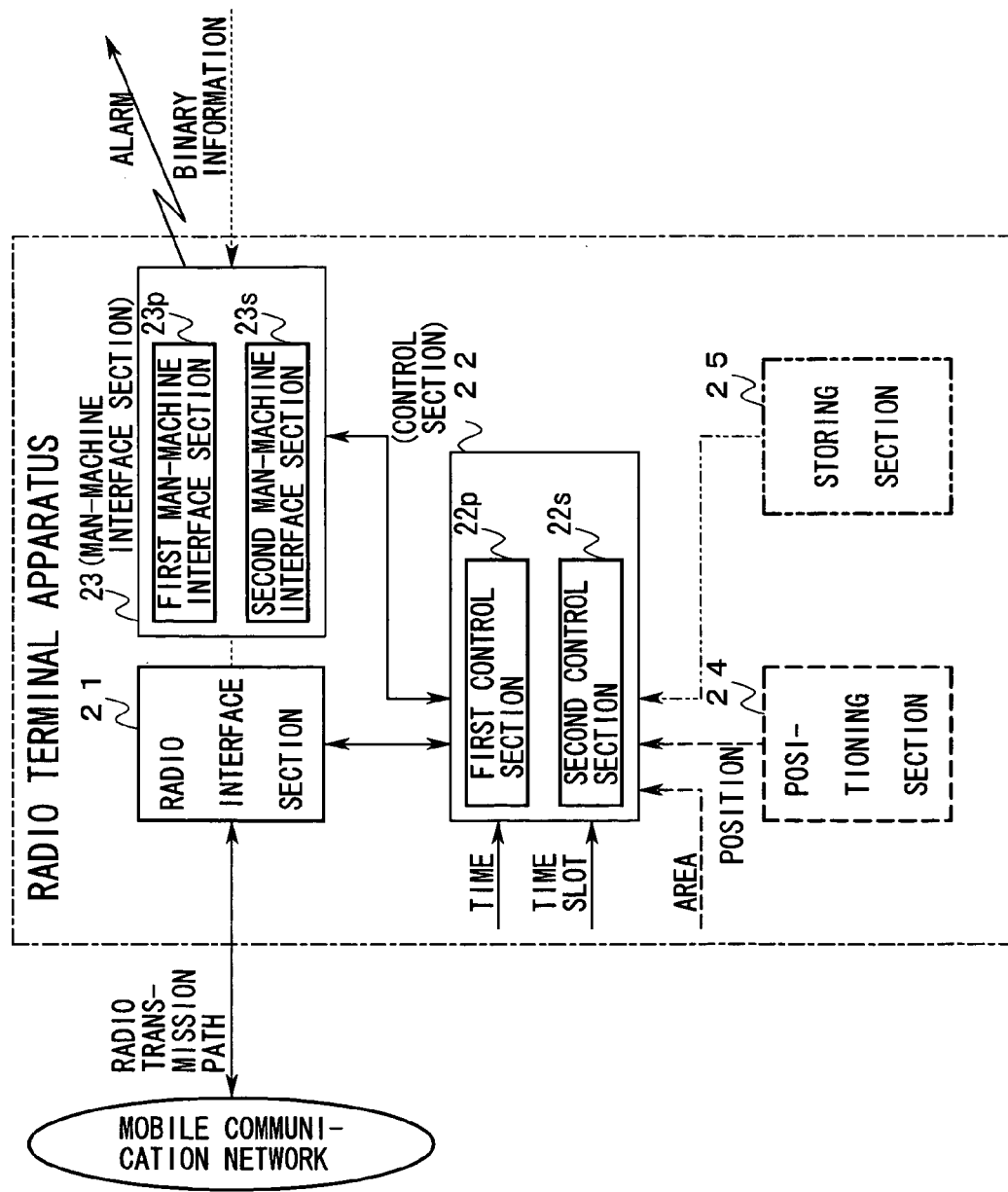
FIG. 2 is a block diagram showing the principles of operation of radio terminal apparatus according to the invention.

FIG. 2 is a block diagram showing the principles of operation of radio terminal apparatus according to the invention.

The radio terminal apparatus shown in FIG. 2 are composed of a radio interface section 21, a control section 22 (22p and 22s), a man-machine interface section 23 (23p and 23s), a positioning section 24, and a storing section 25.

The principle of operation of a first radio terminal apparatus according to the invention is as follows.

The radio interface section 21 accesses a mobile communication network via a radio transmission path. The control section 22 performs a channel control by cooperating with the radio interface section 21. The man-machine interface section 23 performs man-machine interfacing for providing a communication service via the mobile communication network by cooperating with the radio interface section 21 under the control of the control section 22. The control section 22 makes a transition to a special state upon occurrence of a particular event, issues, via the man-machine interface section 23, an alarm to the effect that a crime prevention measure is taken only in the special state, and makes call origination automatically in response to a prescribed manipulation performed through the man-machine interface section 23.

Issued directly from the man-machine interface section 23 provided in the radio terminal apparatus according to the invention, such an alarm is recognized parallel by many people and crime prevention by the alarm is attained without any basic changes in hardware configuration. Further, in an emergency in which certain damage has been caused or may be caused in spite of the issuance of such an alarm, the above-mentioned call origination is effected by a prescribed manipulation that is not performed in an ordinary state.

Therefore, resources provided in the radio terminal apparatus can be utilized for crime prevention effectively with high reliability.

The principle of operation of a second radio terminal apparatus according to the invention is as follows.

When the control section 22 has made a transition to the special state, it sends a notice to that effect to a prescribed communication apparatus via the radio interface section 21 and the mobile communication network.

Such a notice can be used as basic information for, for example, grasping the presence and the total number of radio terminal apparatus that are prepared for a crime by making a transition to the above-mentioned special state and to which a prescribed service relating to security should be provided.

This enables increase in the total quality of such a service and cost reduction.

The principle of operation of a third radio terminal apparatus according to the invention is as follows.

The particular event to be recognized by the control section 22 is that time belongs to a preset time slot.

That is, time for a transition to the special state in which the above-mentioned alarm for realizing crime prevention is issued and that enables call origination in an emergency in which certain damage has been caused or may be caused is given automatically and reliably without any further special manipulation of the manipulator as long as the above-mentioned time slot is set in advance.

This increases the reliability of crime prevention as well as the ease of manipulation and the convenience.

The principle of operation of a fourth radio terminal apparatus according to the invention is as follows.

The particular event to be recognized by the control section 22 is that a value of binary information that is supplied externally via the man-machine interface section 23 is a particular value.

That is, time for a transition to the special state in which the above-mentioned alarm is issued and that enables call origination in an emergency in which certain damage has been caused or may be caused is given reliably as entrance into a period or a state in which preparation for a crime against not only the manipulator but also a variety of subjects should be made effective as long as hardware or like resources for setting the above-mentioned binary information at the particular value are provided and operate reliably.

This makes it possible to attain crime prevention for a variety of subjects reliably.

The principle of operation of a fifth radio terminal apparatus according to the invention is as follows.

The positioning section 24 determines a position of a local station. The particular event to be recognized is that the position determined by the positioning section 24 belongs to a preset area.

That is, time for a transition to the special state in which the above-mentioned alarm for realizing crime prevention is issued and that enables call origination in an emergency in which certain damage has been caused or may be caused is given automatically and reliably without any further special manipulation of the manipulator as long as the above-mentioned area is set in advance.

This increases the reliability of crime prevention as well as the ease of manipulation and the convenience.

The principle of operation of a sixth radio terminal apparatus according to the invention is as follows.

The control section 22 acquires a position that is determined by the positioning section 24 when the control section 22 has made a transition to the special state, and informs, of said position, a called party of a complete call that occurs as a result of the call origination.

That is, when the above-mentioned call origination is made in an emergency in which certain damage has been caused or may be caused, a position of the radio terminal apparatus according to the invention at a time point when the radio terminal apparatus made a transition to the above-mentioned special state is sent automatically.

This enables quick help to the manipulator of the radio terminal apparatus.

The principle of operation of a seventh radio terminal apparatus according to the invention is as follows.

The control section 22 acquires a position that is determined by the positioning section 24 at a time point of the call origination, and informs, of the position, a called party of a complete call that occurs as a result of the call origination.

That is, when the above-mentioned call origination is made in an emergency in which certain damage has been caused or may be caused, a position of the radio terminal apparatus at that time point is sent automatically.

This enables quicker help to the manipulator of the radio terminal apparatus.

The principle of operation of an eighth radio terminal apparatus according to the invention is as follows.

An identifier of the station concerned or a subscriber and information meaning a request for help are stored in the storing section 25 in advance. The control section 22 sends the information stored in the storing section 25 to a called party of a complete call that occurs as a result of the call origination.

That is, when the above-mentioned call origination is made in an emergency in which certain damage has been caused or may be caused, information that is effective for quick determination of the background of the call origination and the radio terminal apparatus as a subject of help can be sent automatically even if the manipulator is rendered in such a situation as to be unable to make a call.

This increases the reliability and quickness of help to the manipulator of the radio terminal apparatus.

The principle of operation of a ninth radio terminal apparatus according to the invention is as follows.

The control section 22 acquires a log relating to the man-machine interfacing, and informs, of the log, a called party of a complete call that occurs as a result of the call origination.

That is, when the above-mentioned call origination is made in an emergency in which certain damage has been caused or may be caused, one or both of a history of manipulations that were performed by the manipulator in advance and a message that was input by the manipulator are sent automatically.

This increases the reliability of an investigation and understanding of the background of the above-mentioned call origination as well as the reliability and quickness of help.

The principle of operation of a 10th radio terminal apparatus according to the invention is as follows.

The control section 22 has a readable storage area, and acquires information via the man-machine interface section 23 in making the call origination and holds the information in the storage area.

That is, information that is input by the manipulator when the above-mentioned call origination is made because certain damage has been caused or may be caused is held automatically.

Therefore, an investigation and understanding of the background of the above-mentioned call origination is performed or attained with high reliability on the basis of the information as long as the crime prevention assisting apparatus according to the invention is recovered and the information is acquired from it.

The principle of operation of an 11th radio terminal apparatus according to the invention is as follows.

The control section 22 has a readable storage area, and acquires pieces of information via the man-machine interface section 23 and holds, in the storage area, latest information that was acquired before the call origination among the pieces of information.

That is, information that was input by the manipulator before the call origination is made in an emergency in which certain damage has been caused or may be caused is held automatically.

Therefore, a close investigation and deep understanding of the background of the above-mentioned call origination is performed or attained with high reliability on the basis of the information as long as the crime prevention assisting apparatus according to the invention is recovered and the information is acquired from it.

The principle of operation of a 12th radio terminal apparatus according to the invention is as follows.

The control section 22 acquires pieces of information via the man-machine interface section 23, and sends latest information that was acquired immediately before the call origination among the pieces of information to a called party of a complete call that occurs as a result of the call origination.

That is, information that was input by the manipulator before the call origination is made in an emergency in which certain damage has been caused or may be caused is sent automatically.

This makes it possible to perform or attain a close investigation and deep understanding of the background and cause of the above-mentioned call origination on the basis of the information thus received.

The principle of operation of a 13th radio terminal apparatus according to the invention is as follows.

The control section 22 acquires information via the man-machine interface section 23 in making the call origination, and sends the acquired information to a called party of a complete call that occurs as a result of the call origination.

That is, information that is input by the manipulator when the call origination is made in an emergency in which certain damage has been caused or may be caused is sent automatically.

This makes it possible to perform or attain a close investigation and deep understanding of the background and cause of the above-mentioned call origination on the basis of the information thus received.

The principle of operation of a 14th radio terminal apparatus according to the invention is as follows.

The control section 22 sends the information to the called party as a mail.

That is, information to be used for an investigation and understanding of the background and cause of the above-mentioned call origination is transmitted to a destination even in a state that the destination cannot respond or a connection-type communication channel cannot be established between the radio terminal apparatus and the destination for a certain reason.

This ensures with high reliability that such information is reflected in an investigation and understanding of the above-mentioned background and cause.

The principle of operation of a 15th radio terminal apparatus according to the invention is as follows.

The control section 22 performs processing of sending the information to the called party with a higher priority given to it than processing relating to the man-machine interfacing.

That is, even if any manipulation is performed through the man-machine interface section 23, the transmission of information to be used for an investigation and understanding of the background and cause of the above-mentioned call origination is completed before a response is made to the manipulation.

This allows such information to be reflected in an investigation and understanding of the above-mentioned background and cause with high reliability.

The principle of operation of a 16th radio terminal apparatus according to the invention is as follows.

Information that is acquired via the man-machine interface section 23 is one or both of a sound and an image.

That is, the background and cause of the above-mentioned call origination is acquired as an actual sound and/or image.

This makes it possible to perform an investigation and understanding of the background and cause efficiently with high reliability.

The principle of operation of a 17th radio terminal apparatus according to the invention is as follows.

The control section 22 maintains, in a hands-free mode, a complete call that has occurred as a result of the call origination.

In general, in the hands-free mode, a speech signal is sent and received at a higher level than in an ordinary mode. Therefore, information to be used for an investigation and understanding of the above-mentioned background and cause can be acquired with high reliability and a person who is committing a crime is urged to leave the site earlier as the level of a received speech sound is set higher.

This increases the reliability of crime prevention and minimizes the damage.

The principle of operation of an 18th radio terminal apparatus according to the invention is as follows.

The control section 22 includes first control section 22$p$ for performing the channel control and second control section 22$s$ for performing processing other than the channel control by cooperating with the first control section 22$p$ via a communication link.

The man-machine interface section 23 includes first man-machine interface section 23$p$ for performing man-machine interface for providing the communication service under the control of the first control section 22$p$ and second man-machine interface section 23$s$ for assisting the man-machine interfacing under the control of the second control section 22$s$, the second man-machine interface section 23$s$ being detachable together with the second control section 22$s$ from a set of the first man-machine interface section 23$p$, the first control section 22$p$, and the radio interface section 21.

That is, being part of the radio terminal apparatus according to the invention and configured so as to be detachable, the second control section 22$s$ and the second man-machine interface section 23$s$ function in the same manner as the above-mentioned first crime prevention assisting apparatus by cooperating with the main body of the radio terminal apparatus.

Therefore, an alarm issued from the second man-machine interface section 23$s$ are recognized parallel by many people and the reliability of crime prevention is increased as in the case of the above-mentioned first crime prevention assisting apparatus, which is in contrast to the case where the second control section 22$s$ and the second man-machine interface section 23$s$ operate only in a state that they are incorporated in the body of the radio terminal apparatus.

Figure 3:
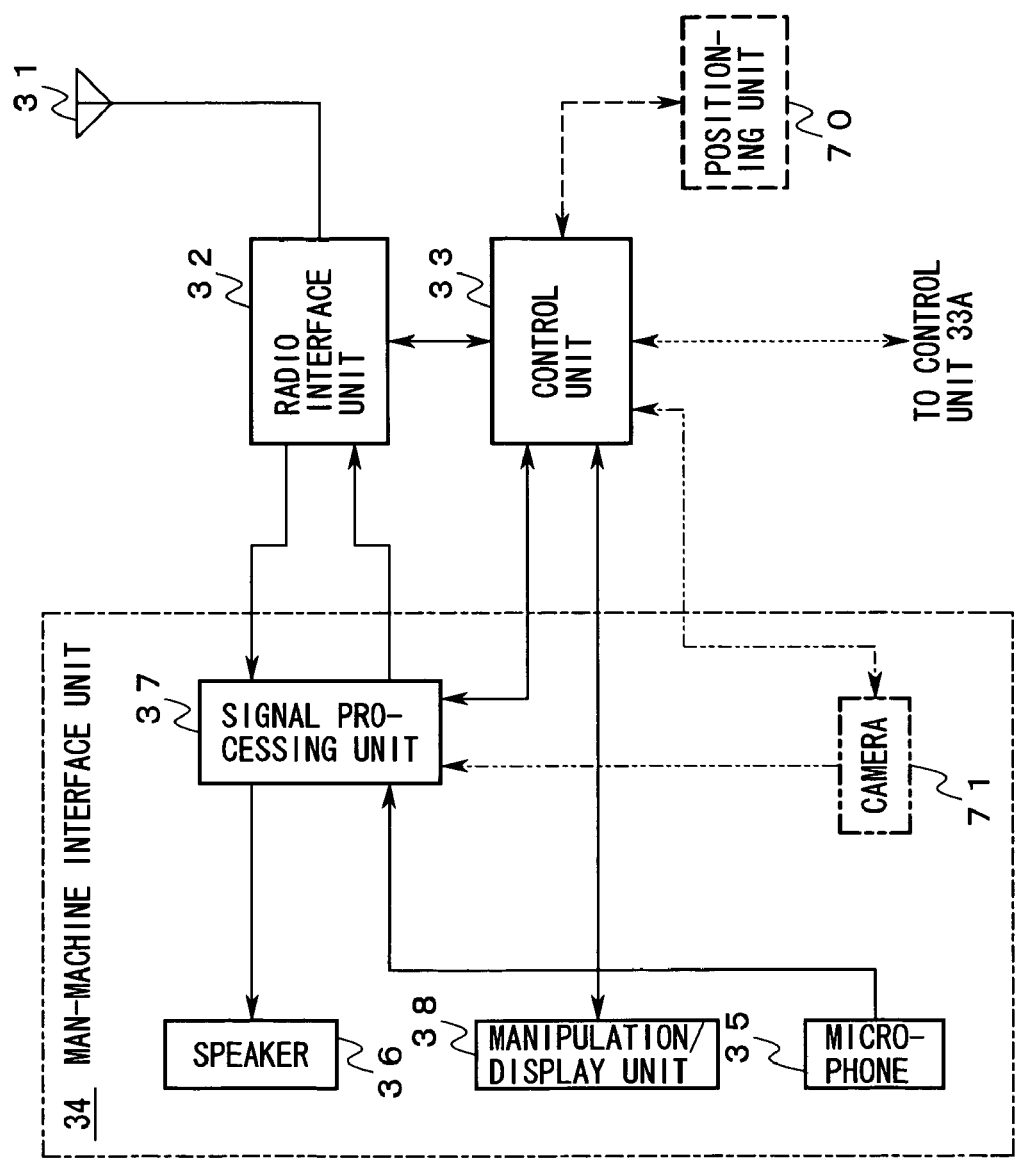
FIG. 3 shows first to third embodiments and a sixth embodiment of the invention.

FIG. 3 shows first and third to sixth embodiments of the invention.

As shown in FIG. 3, a radio interface unit 32 is connected to the feeding point of an antenna 31 and a first input/output port of a control unit 33 is connected to a control terminal of the radio interface unit 32.

A man-machine interface unit 34 is connected to a modulation input and a demodulation input (port) of the radio interface unit 32 and second and third input/output ports of the control unit 33.

The man-machine interface unit 34 is composed of the following components:

Microphone 35
Speaker 36
Signal processing unit 37 that is connected to the second input/output port of the control unit 33 and has an input and an output that are connected to the microphone 35 and the speaker 36, respectively.
Manipulation/display unit 38 that is connected to the third input/output port of the control unit 33.

Embodiment 1

Figure 4:
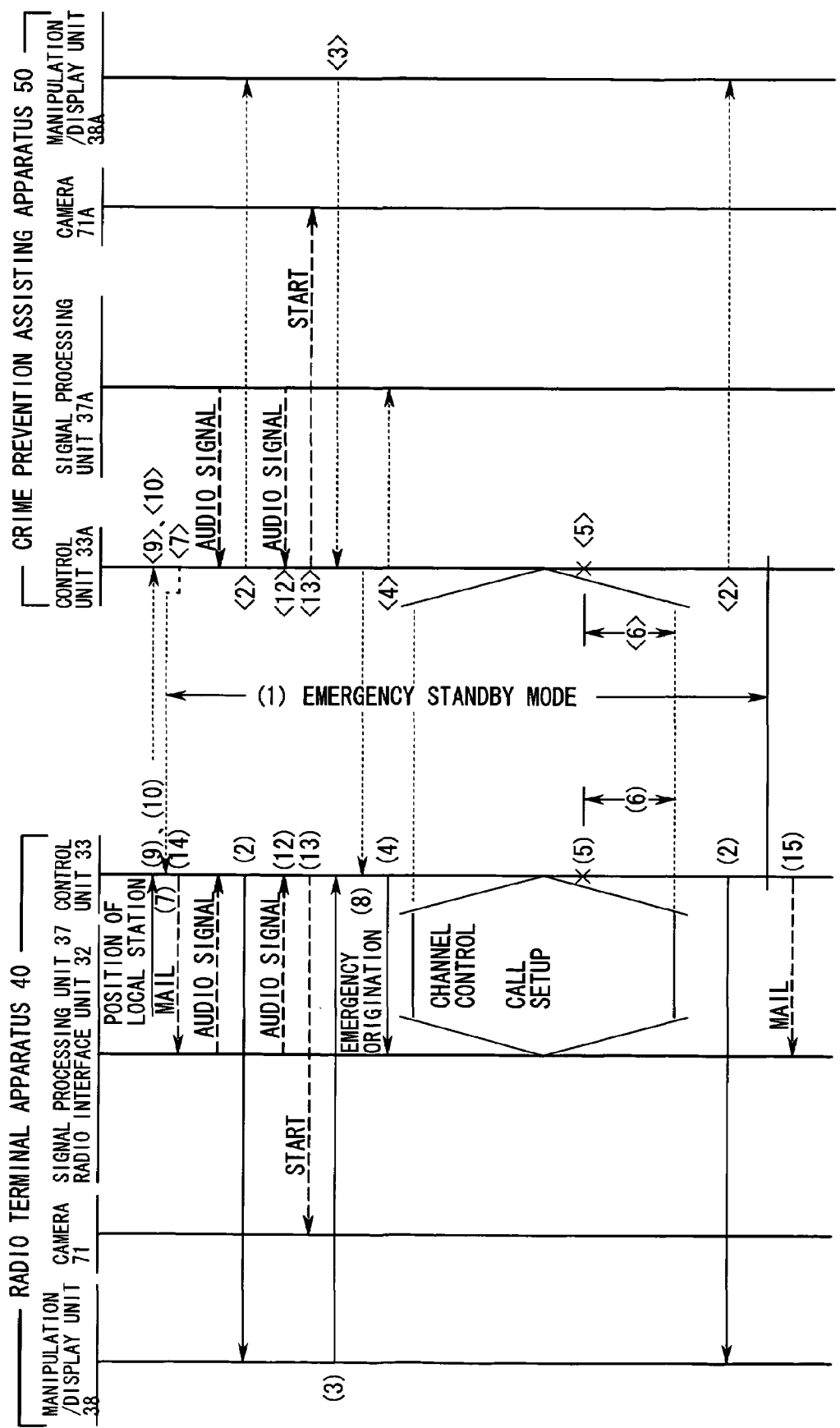
FIG. 4 is a chart illustrating the operations of the first to sixth embodiments of the invention.

FIG. 4 is a chart illustrating the operations of the first to sixth embodiments of the invention.

Figure 5:
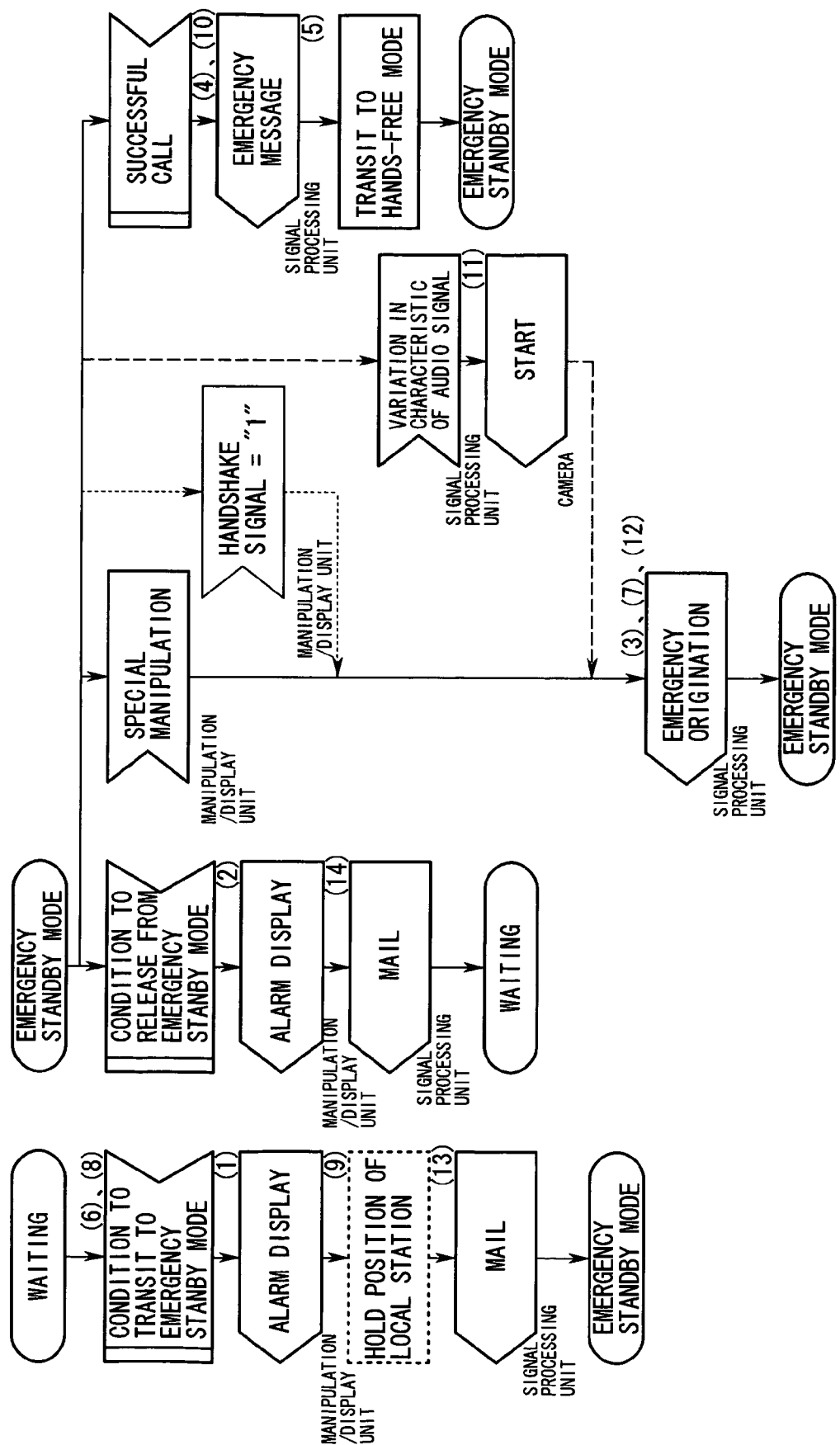
FIG. 5 is a flowchart showing the operations of the first to sixth embodiments of the invention.

FIG. 5 is a flowchart showing the operations of the first to sixth embodiments of the invention.

The operation of the first embodiment of the invention will be described below with reference to FIGS. 3-5.

The control unit 33 forms a radio communication path between a local station and a radio base station via the radio interface unit 32 and the antenna 31 according to a prescribed channel control procedure, and accesses a mobile communication system via the thus-formed radio transmission path and the radio base station.

The control unit 33 performs man-machine interfacing by cooperating with the manipulation/display unit 38. The control unit 33 recognizes a call origination, a termination response, and other events under the man-machine interfacing and performs processing suitable for each of those events.

The signal processing unit 37 performs the following processing under the control of the control unit 33:

Codes, decodes, or performs other conversion on a speech signal that is exchanged between the radio interface unit 32 and the microphone 35 or the speaker 36.
Generates a ringing sound or other service tones that are suitable for a communication service to be provided to the subscriber (manipulator) (including an output via the speaker 36).

The invention is characterized in processing that is performed in manners described later under the control of the control unit 33. Processing and cooperation between individual units that are performed in a process of the above-described channel control and call origination and termination will not be described because they are not important features of the invention and can be realized by using a variety of known techniques.

The control unit 33 incorporates a clock that is backed up by a battery, in incremented in a prescribed cycle, and shows time (for the sake of simplicity, it is assumed here that time includes year, month, and day values). And the control unit 33 stores, in a prescribed storage area (hereinafter referred to as period register), a period that is specified by a manipulator under the above-mentioned man-machine interfacing.

For the sake of simplicity, it is assumed here that such a period is given in the form of combinations of year, month, day, hour, and minute values corresponding to a start point and an end point of the period.

An emergency message that includes an identifier of a local station (or the subscriber) and means that emergency origination (described later) has been made is stored in advance in a particular storage area (hereinafter referred to as message register) of the control unit 33.

In a period when information indicating an effective period is stored in the period register, the control unit 33 judges whether the time that is shown by the above-mentioned clock belongs to that period. Only in a period (indicated by symbol (1) in FIG. 4) when the judgment result is true, the control unit 33 drives an indicator provided in the manipulation/display unit 38 (indicated by symbol (2) in FIG. 4) and thereby makes a known special alarm display (hereinafter referred to as alarm display) of the following items (steps (1) and (2) in FIG. 5):

(a) Quick emergency origination is possible when damage has been caused or may be caused by a certain crime.

(b) The fact that damage has been caused will not be kept in secrecy because effective information for an investigation and identification of a person who caused the damage will be collected, the collected information will be provided to a prescribed organization, and help will be requested quickly.

For the sake of simplicity, an operation mode of the control unit 33 in such a period will be referred to as emergency standby mode.

Further, the control unit 33 monitors whether a special manipulation (exemplified below) has been made that may be performed by a manipulator through the manipulation/display unit 38 when damage has been caused or will possibly be caused to him or her by a certain crime. If such a manipulation has been made (indicated by symbol (3) in FIG. 4), the control unit 33 automatically originates a call (hereinafter referred to as emergency origination) to a prescribed termination destination (e.g., the number "110" that was set by the manipulator in advance) via the signal processing unit 37, the radio interface unit 32, and the antenna 31 (indicated by symbol (4) in FIG. 4; step (3) in FIG. 5).

Manipulation that a particular key that is disposed on the side surface, for example, of the body of the radio terminal apparatus and can be depressed continuously for several seconds by the manipulator with his or her thumb.

Manipulation that the above particular key is depressed a prescribed number of times repeatedly in a prescribed time.

Manipulation that renders, in a particular state (short-circuit state or an open state), a contact that is recognized by the control unit 33 (e.g., a manipulation of pulling out the strap).

When a call that occurred in response to such emergency origination has become a complete call (indicated by symbol (5) in FIG. 4), the control unit 33 sends an emergency message (mentioned above) to the termination destination as a speech signal of the complete call (repeatedly at a prescribed frequency; step (4) in FIG. 5) and maintains the complete call in a hands-free mode (indicated by symbol (6) in FIG. 4; step (5) in FIG. 5).

As described above, according to this embodiment, the manipulator can prevent a crime by making a display of items (a) and (b) in accordance with his or her intention. When damage has been caused or will possibly be caused, the manipulator can send a notice to that effect to a desired termination destination and request help quickly and easily.

Therefore, the existing manipulation/display unit 38 provided in the radio terminal apparatus is used effectively under the control of the control unit 33, whereby commitment of a crime and undue expansion of damage can be prevented reliably at a low cost and the same person can be prevented from causing damage repeatedly.

In this embodiment, the above-mentioned emergency message is held in the message register in advance as voice information and sent to the termination destination in the form of a speech signal in an audible frequency band.

Alternatively, the emergency message may be held in the message register as, for example, digital information generated by prescribed encryption or coding and sent to the termination destination in the form of a speech signal having a prescribed format or being superimposed on a speech signal.

In this embodiment, a complete call that has occurred in response to emergency origination is maintained in a hands-free mode, whereby a voice issued from the termination destination is heard simultaneously by the manipulator and the person who is committing a crime via the speaker 36.

However, where there is a probability that the emergency message heard by a person who is committing a crime provokes him or her contrary to the intention, the employment of a hands-free mode operation may be canceled or the emergency message may be sent in the form of digital information or like information that cannot be heard by the person who is committing a crime.

In this embodiment, the above-described crime prevention etc. are attained by utilizing existing resources in the man-machine interface unit 34 under the control of the control unit 33.

However, the invention is not limited to such a configuration. For example, as indicated by a thick two-dot chain line in FIG. 6, the radio terminal apparatus may be configured so as to attain functional distribution in which parts of the control unit 33 and the signal processing unit 37 that do not relate to the above-described channel control or call setting and the microphone 35, the speaker 36, and the manipulation/display unit 38 are made detachable from the main body and can cooperate with the main body via a prescribed communication link.

In this embodiment, the alarm display is made by the control unit 33's driving light-emitting elements such as light-emitting diodes provided in the manipulation/display unit 38.

Alternatively, for example, a combination from the following audio signal and visual information may be output instead of or together with the alarm display:

Alarm sound that is generated by a sound generating body that is driven by the control unit 33 and whose intermittence pattern or timbre are peculiar.

Characters or figures drawn with a luminous or fluorescent paint.

Name or mark (e.g., company logo) of a security company or some other organization with which the manipulator is under a contract relating to a crime prevention service.

Further, in this embodiment, existing resources in the man-machine interface unit 34 are used under the control of the control unit 33 and the configuration of the hardware that is provided inherently in the radio terminal apparatus is not changed.

Figure 7:
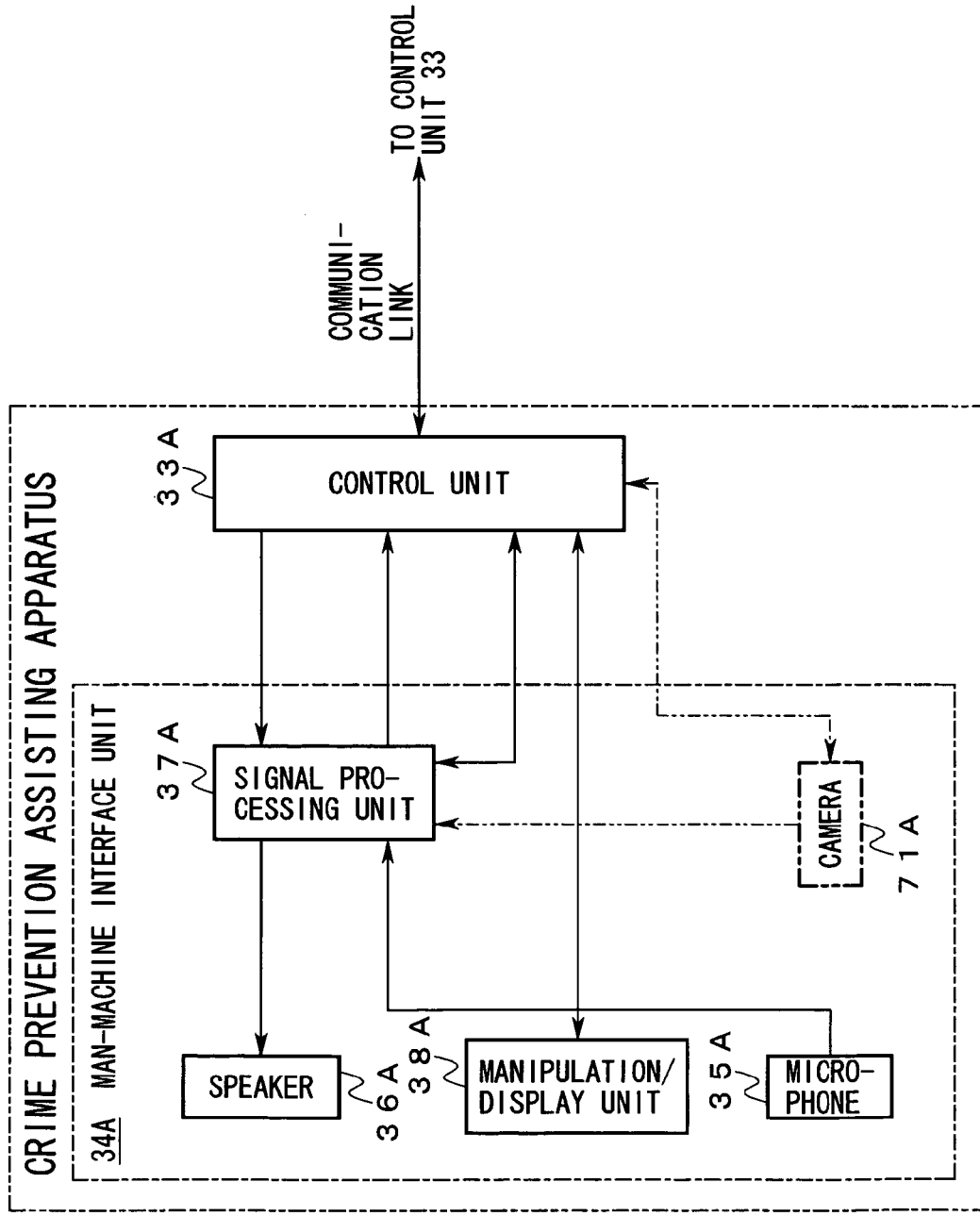
FIG. 7 is a second diagram showing other configurations of the first to sixth embodiments.

However, the invention is not limited to such a configuration. For example, the visibility of the alarm display and the reliability of crime prevention that relies on the visibility may be enhanced by constructing a crime prevention assisting apparatus that is connected to the above-described radio terminal apparatus by a prescribed cable, attached to a handbag, the clothes of the manipulator, or the like, and composed of the following components as shown in FIG. 7:

Man-machine interface unit 34A that assists the man-machine interface unit 34 and has functions according to the invention (the configuration the man-machine interface 34A is the same as that of the man-machine interface unit 34 and hence will not be described; components of the man-machine interface 34A having corresponding components in the man-machine interface unit 34 are given the same reference symbols as the latter except for addition of suffix "A").

Control unit 33A that assists the control unit 33, has functions according to the invention, and also has a communication port for forming a prescribed communication link between itself and a communication port of the control unit 33 of the radio terminal apparatus.

The configurations of the individual units of the crime prevention assisting apparatus are the same as those described in this embodiment except that processing relating to the channel control and the call setting is performed with cooperation between the control unit 33A and the control unit 33 (provided in the radio terminal apparatus).

The operations of the individual units that are performed with such cooperation in this embodiment and the following third to sixth embodiments are the same as described above except that functional distribution is attained with such cooperation, and hence will not be described in detail (in FIG. 4, they are indicated by broken lines and given the same reference numerals, interposed between marks < and >, as the corresponding operations.

Figure 6:
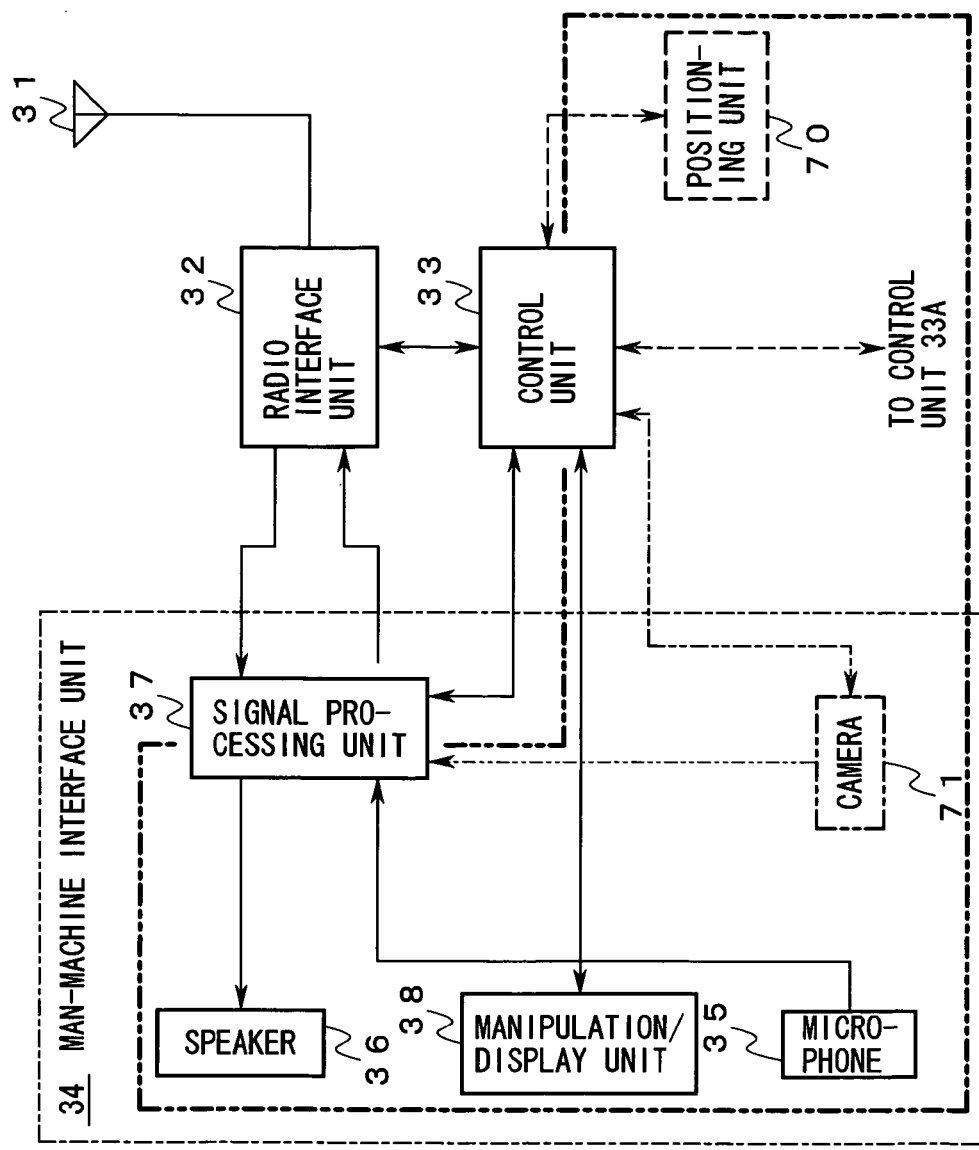
FIG. 6 is a first diagram showing other configurations of the first to sixth embodiments.

Further, the configuration shown in FIG. 6 or 7 is likewise applicable to any of the following embodiments. Therefore, for the sake of simplicity, the configuration and operation of each of the following embodiments will be described so as to be restricted to those relating to the configuration shown in FIG. 2 as long as it is possible.

Embodiment 2

FIG. 8 shows a second embodiment of the invention.

As shown in FIG. 8, the radio terminal apparatus 40 shown in FIG. 2 and the crime prevention assisting apparatus 50 shown in FIG. 7 are configured as follows.

The radio terminal apparatus 40 is equipped with a receptacle 41 that conforms to a plug 61 that is connected to one end of a cable 60 for forming the above-mentioned communication link between the radio terminal apparatus 40 and the crime prevention assisting apparatus 50.

The communication port of the control unit 33 includes an input terminal for a binary handshake signal that is pulled up via a resistor 42 inside the radio terminal apparatus 40 and connected to a particular pin of the receptacle 41.

The crime prevention assisting apparatus 50 additionally includes the following components:

Connector 51 that is attached to the body at a prescribed position and has two pins one of which is grounded.

Short pin 52 for short-circuiting the two pins when connected to the connector 51 from outside the body.

Receptacle 53 that conforms to a plug 62 that is connected to the other end of the above-mentioned cable 60.

Line 54 (a circuit pattern or any other wiring line) directly connecting the other pin of the connector 51 to a particular one of the pins of the receptacle 53 that is connected to the above-mentioned particular pin via the plug 62, the cable 60, and the plug 61.

The operation of the second embodiment of the invention will be described below with reference to FIGS. 4, 5, and 8.

In the radio terminal apparatus 40, the logical value of the above-mentioned handshake signal that is supplied to the control unit 33 is set at "0" only in a period when the following conditions are satisfied and set at "1" by the resistor 42 in a period when one of those conditions is not satisfied:

The crime prevention assisting apparatus 50 (including the receptacle 53) is connected to the receptacle 41 via the plug 61, the cable, and the plug 62.

The short pin 52 is connected to the connector 51 of the crime prevention assisting apparatus 50.

In the radio terminal apparatus 40, the control unit 33 monitors the logical value of the handshake signal at a prescribed frequency (step (6) in FIG. 5). When the logical value has become "0" (indicated by symbol (7) in FIG. 4), the control unit 33 makes a transition to an emergency standby mode.

In the emergency standby mode, the control unit 33 monitors the logical value of the handshake signal at a prescribed frequency. When the logical value has become "1" (indicated by symbol (8) in FIG. 4) upon occurrence of one of the following events, the control unit 33 performs emergency origination (described above; step (7) in FIG. 5):

The short pin 52 has been pulled out of the connector 51 by the manipulator.

The plug 62 and the receptacle 53 have been disconnected from each other.

The plug 61 and the receptacle 41 have been disconnected from each other.

That is, the conditions for a transition to the emergency standby mode are satisfied reliably in the state that the DC loop that provides the logical value of the handshake signal is formed outside the radio terminal apparatus 40 via the cable 60 and the crime prevention assisting apparatus 50, and time for emergency origination is given reliably when the DC loop disappears.

Therefore, according to this embodiment, even if the invention is implemented as the crime prevention assisting apparatus 50 shown in FIG. 8, the radio terminal apparatus 40 can reliably makes a transition to the emergency standby mode and can perform, with high reliability, emergency origination in response to a variety of manipulations that can be performed by the manipulator.

In this embodiment, the short pin 52 has such a large size and such a shape as to allow the manipulator to pull out it easily and directly and the plugs 61 and 62 have such sizes and shapes as to allow the manipulator to easily disengage those from the respective receptacles 41 and 53.

However, the invention is not limited to such a configuration. For example, a configuration is possible in which one end of a string is fixed to all or part of the short pin 52, the plugs 53 and 61, and the receptacles 41 and 62 and the above-mentioned DC loop is caused to disappear by force of the manipulator that is applied via the string.

In this embodiment, the above-mentioned DC loop disappears when the receptacle 41 and the plug 61 are disengaged from each other. Therefore, emergency origination may occur even in a state it need not be effected.

Such undesired emergency origination may be prevented or avoided by software that is incorporated in the control unit 33 and activated under a prescribed man-machine interface.

Alternatively, where such undesired emergency origination should be prevented or avoided with no involvement of the control unit 33, the following configuration, for example, may be employed as indicated by a dotted line, a broken line, and a chain line in FIG. 8:

- The resistor 42 is not connected to the corresponding input of the control unit 33 as indicated by a dotted line in FIG. 8 and a voltage converting unit 43 having an output that is connected to the above input is provided as indicated by a broken line in FIG. 8.
- A resistor 44 for pulling down the corresponding input of the controller 33 (i.e., giving a logical value "0" to that input) is provided as indicated by a chain line in FIG. 8.
- Pins that are brought in contact with each other only when the receptacle 41 and the plug 61 are engaged with each other are added to the receptacle 41 and the plug 61, respectively.
- Feedback power supply path from a DC power line to the above input of the control unit 33 (described below more specifically) is formed that gives a logical value "1" meaning time for emergency origination to the input of the control unit 33 only when the receptacle 41 and the plug 61 are engaged with each other and the above-mentioned DC loop does not exist.

DC power line→resistor 42→receptacle 41→plug 41→cable 60→plug 41→receptacle 41→voltage converting unit 43→control unit 33

Embodiment 3

The third embodiment of the invention will be described below.

As indicated by a broken line in FIG. 3, this embodiment is provided with a positioning unit 70 that is connected to a corresponding input/output port of the control unit 33.

The operation of the third embodiment of the invention will be described below with reference to FIGS. 3-5.

This embodiment is characterized in that time for a transition to the emergency standby mode and conditions for maintenance of the emergency standby mode are determined in the following manner.

The control unit 33 has a storage area (hereinafter referred to as particular area register) that is backed up by a battery and is to store particular area information indicating an area which is to be put in the emergency standby mode.

The control unit 33 acquires particular area information that was given by the manipulator in a process of man-machine interfacing that was performed via the manipulation/display unit 38, and makes the acquired particular area information held in the particular area register.

On the other hand, the positioning unit 70 determines a position of a local station by, for example, receiving radio waves coming from GPS satellites and performing a calculation on the basis of those radio waves according to a prescribed navigation method.

The control unit 33 judges whether the position of a local station belongs to the area indicated by the particular area information that is stored in the particular area register (step (8) in FIG. 5). If the judgment result has changed from false to true (indicated by symbol (9) in FIG. 4), the control unit 33 makes a transition to the emergency standby mode.

The control unit 33 maintains the emergency standby mode as long as the judgment result remains true.

That is, a transition to the emergency standby mode is made automatically when the radio terminal apparatus according to the invention starts to exist in the area that was specified in advance by the manipulator of the radio terminal apparatus and the emergency standby mode is maintained as long as the radio terminal apparatus exists in the area.

Therefore, the emergency standby mode is established reliably as long as the above-mentioned particular area information is specified properly in advance, whereby crime prevention and minimization of damage can be attained with high reliability.

In this embodiment, both of time for a transition to the emergency standby mode and time to release from the emergency standby mode are given on the basis of the particular area information.

However, such time may be given as any combination with, for example, conditions (including the above-mentioned period) that are given by the manipulator in a process of man-machine interfacing that is performed via the manipulation/display unit 38.

In this embodiment, time for a transition to the emergency standby mode and time to release from the emergency standby mode are recognized on condition that the position of the local station is always acquired by the positioning unit 70.

However, the invention is not limited to such a configuration. For example, the positioning unit 70 and the control unit 33 cooperate with each other to recognize a state that the positioning unit 70 is not receipt of radio-frequency signals (coming from GPS satellites or the like) complying with the radio navigation used therein. The control unit 33 takes initiative of notifying the manipulator of the recognized state via the manipulation/display unit 38, to thereby urge him/her to move to a location where the positioning unit 70 can determine the position of the local station.

Embodiment 4

The operation of the fourth embodiment of the invention will be described below with reference to FIGS. 3-5.

This embodiment is characterized by the following process that is executed by the control unit 33.

The control unit 33 takes in positions of a local station that are determined by the positioning unit 70 sequentially.

When a transition is made to the emergency standby mode, the control unit 33 causes a position of a local station that was determined by the positioning unit 70 in advance of this time point (or a position of a local station that will be determined by the positioning unit 70 first after this time point) to be held in a particular storage area (hereinafter referred to as position register) (indicated by symbol (10) in FIG. 4; step (9) in FIG. 5).

When a call that occurred in response to the emergency origination has become a complete call, the control unit 33 sends the position of a local station that is held in the position register to a termination destination of the call together with the above-mentioned emergency message (indicated by symbol (11) in FIG. 4; step (10) in FIG. 5).

That is, since the position of the radio terminal apparatus as the transmission source of the emergency message is automatically sent to the termination destination together with the emergency message, that party can quickly take action on the request for help and hence the reliability of crime prevention is increased.

In this embodiment, automatically sending a position of the radio terminal apparatus where it exists when a transition has been made to the emergency standby mode together with the emergency message assists recognition of an approximate position of the radio terminal apparatus where it exists when emergency origination is made.

However, the invention is not limited to such a configuration. For example, the reliability of crime prevention may be increased further by sending a position of a local station that is determined by the positioning unit 70 immediately before or after emergency origination together with the emergency message instead of or in addition to the above-mentioned position.

Embodiment 5

The fifth embodiment of the invention will be described below.

In this embodiment, as indicated by a two-dot chain line in FIG. 3, the man-machine interface unit 34 is equipped with a camera 71 that has a control terminal connected to a corresponding input/output port of the control unit 33 and whose output is connected to a corresponding input of the signal processing unit 37.

The operation of the fifth embodiment of the invention will be described below with reference to FIGS. 3-5.

For example, the control unit 33 performs the following processing by cooperating with the signal processing unit 37 and driving the camera 71 in response to a prescribed request that is recognized during man-machine interfacing performed via the manipulation/display unit 38:

Sets and updates conditions of photographing performed by the camera 71.

Codes, converts, and stores image information that is output from the camera 71.

Sends the image information to a destination (this is not limited to the other party of a telephonic complete call and may be a mail destination) that is specified by the manipulator.

The driving of the camera 71 and the ordinary processing to be performed on image information obtained by the camera 71 will not be described because they are not important features of the invention and can be realized by using a variety of known techniques.

This embodiment is characterized by the following process that is executed by the control unit 33:

In the emergency standby mode, monitors the level and the frequency spectrum of an audio signal obtained by the microphone 35 by cooperating with the signal processing unit 37, starts to drive the camera 71 at a time point when a variation in the level or the frequency spectrum has exceeded threshold value (indicated by symbol (13) in FIG. 4; step (11) in FIG. 5), and makes emergency origination (step (12) in FIG. 5).

Even if such a time point is not recognized, records an audio signal and image information obtained by the microphone 35 and the camera 71, respectively, in a prescribed period by cooperating with the signal processing unit 37 at a time point when emergency origination should be made in response to a request from the manipulator.

Sends, together with the emergency message, the thus-recorded audio signal and image information to the destination of a complete call that has occurred as a result of the above-mentioned emergency origination.

That is, not only a message meaning mere occurrence of an emergency or a verbal message of the manipulator but also a sound and an image indicating a state of the emergency (may include a situation before the occurrence of the emergency) is sent to the termination destination of a call that has occurred as a result of emergency origination in the emergency standby mode.

Since information that would be useful for an investigation including identification of a person who is committing a crime is recorded automatically and sent to a desired termination destination, the reliability of crime prevention is increased as the fact that such a measure is available become more known to the public.

In this embodiment, both of a sound and an image are recorded automatically and sent to a desired termination destination as described above.

However, the invention is not limited to such a configuration; only one of a sound and an image (one requested by the manipulator may be chosen) may be sent in the same manner.

In this embodiment, the camera 71 starts to be driven before emergency origination when the above-mentioned condition is satisfied.

However, the invention is not limited to such a configuration. For example, photographing of a desired object by the camera 71 and recording of image information obtained by the photographing may be performed when necessary according to man-machine interfacing that is performed via the manipulation/display unit 38.

In this embodiment, both of a recorded sound and image are sent automatically to the termination destination.

However, the invention is not limited to such a configuration. For example, a configuration is possible in which the sound and image are merely stored in a prescribed nonvolatile memory provided in the radio terminal apparatus, that is, they are not sent to the outside.

In this embodiment, the above-mentioned sound and image are sent to a desired termination destination as a speech signal together with the emergency message or as the emergency message.

However, the invention is not limited to such a configuration. For example, the sound and image may be sent as a mail (or an attachment file) of the emergency message and thereby secured as a subject of a careful analysis.

Further, in this embodiment, the transmission of the sound and image can be suspended in a process of man-machine interfacing via the manipulation/display unit 38.

However, the invention is not limited to such a configuration. For example, the transmission of the sound and image may be completed with high reliability by giving a higher priority to it than the above-mentioned man-machine interfacing under process management that is performed by the control unit 33 and using spare power that is stored in advance in a supercapacitor or the like even if the supply of drive power to the radio terminal apparatus is stopped (i.e., the battery is removed).

In this embodiment, photographing conditions are incorporated in advance in the camera 71 as software to be executed by the control unit 33 in advance and ones suitable for the emergency standby mode are set automatically.

However, for example, such photographing conditions may be set as any combination from the following items:

The angle of field is set at a maximum value.

The coverage is set in a direction of a sound source that is determined as a result of signal processing that is performed by the signal processing unit 37 on a plurality of signals obtained parallel by a plurality of acousto-electric converters provided in the microphone 35 and that corresponds to a major component of a variation in the above-mentioned level or frequency spectrum.

The focal distance is set to a relative distance of a sound source that is determined as a result of signal processing that is performed by the signal processing unit 37 on a plurality of signals obtained parallel by the plurality of acousto-electric converters provided in the microphone 35 and that corresponds to a major component of a variation in the above-mentioned level or frequency spectrum.

Embodiment 6

The sixth embodiment of the invention will be described below with reference to FIGS. 3-5.

This embodiment is characterized by the following processing that is performed by the control unit 33.

For example, a mail address of a host computer of a security company with which the manipulator of the radio terminal apparatus is under a contract relating to a crime prevention service is stored in advance in a particular storage area (hereinafter referred to as crime prevention address register) of the control unit 33.

Further, at each of a time point when the control unit 33 has made a transition to the above-mentioned emergency standby mode (indicated by symbol (14) in FIG. 4) and a time point when the control unit 33 has left the emergency standby mode (indicated by symbol (15) in FIG. 4), the control unit 33 automatically generates a mail to that effect that also shows an identifier (or contract number) of its own radio terminal apparatus and the radio terminal apparatus and sends the generated mail to a host computer that is indicated by the main address stored in the above-mentioned crime prevention address register. (steps (13) and (14) in FIG. 5).

That is, such a security company or a like organization can manage, in a unified manner, radio terminal apparatus that may make a transition to the emergency standby mode and make emergency origination and also can grasp a geographical distribution of those radio terminal apparatus.

Therefore, the deployment of personnel and other resources to be activated quickly in response to emergency origination and major areas to be patrolled for the purpose of crime prevention can be optimized for the needs of the actual crime prevention service, whereby proper service quality can be maintained and cost reduction can be attained.

In each of the above embodiments, no information that is input by the manipulator is added to the information to be sent to a desired destination as the emergency message or information added to the emergency message.

However, the invention is not limited to such a configuration. For example, a configuration is possible in which the control unit 33 records a log of man-machine interfacing that was performed via the manipulation/display unit 38 prior to emergency origination and sends the log as the emergency message or together with the emergency message, whereby information that may be the background of the emergency origination is collected automatically.

In each of the above embodiments, the invention is applied to the ratio terminal apparatus shown in FIG. 3, 6, or 8 or the crime prevention assisting apparatus that cooperates with that ratio terminal apparatus as shown in FIG. 7.

However, the invention can be applied to a radio terminal apparatus even if functional distribution or load distribution is attained there in any form. In the above-mentioned crime prevention assisting apparatus, functional distribution or load distribution may be attained in any form.

Each of the above embodiments includes no detailed disclosure about the type of a mobile communication system that should be accessed by the radio terminal apparatus according to the invention.

However, such a mobile communication system may employ any zone configuration, channel allocation, and multiple access method because the important features of the invention do not relate to the channel control or call setting procedure at all.

In each of the above embodiments, a manipulator is not positively informed of any manipulation procedures relating to of a transition to the emergency standby mode and emergency origination. Therefore, persons other than the person who usually manipulates the radio terminal apparatus according to the invention cannot use the emergency standby mode or make emergency origination.

However, the invention is not limited to such a configuration. For example, to assist persons other than the person who usually manipulates the radio terminal apparatus in using the emergency standby mode and making emergency origination, a manipulation procedure may be guided via the manipulation/display unit 38 during execution of a particular process that is activated automatically by the control unit 33 in a startup period immediately after application of power, when a particular manipulation is performed by a manipulator, and when a transition to the emergency standby mode is made automatically.

Further, each of the above embodiments includes no disclosure about handshake processing that should be performed to maintain the prescribed cooperation between the manipulation display units 38 and 38A, the signal processing units 37 and 37A, the positioning unit 70, and the control units 33 and 33A.

However, such handshake will not be described because it is not an important feature of the invention and can be realized by using a variety of known techniques.

In each of the above embodiments, the invention is applied only to attain crime prevention for lowering the probability that a manipulator who is carrying a portable radio terminal apparatus suffers from damage of a crime.

However, the invention is not limited to such a kind of crime prevention. For example, the invention may be applied to prevention of a car theft in the following manner. A sensor or a contact is provided to recognize opening or closing of a door of a car, a start of the engine, or the like as time for emergency origination. The termination destination of a call that occurs as a result of the emergency origination or the destination of the emergency message is set to a communication terminal (may be a personal computer having a communication port or a like information terminal as well as a portable radio terminal apparatus or a telephone) through which the owner or a driver of the car can respond.

The invention is not limited to the above embodiments and various modifications may be made without departing from the spirit and scope of the invention. Any improvement may be made in part or all of the components.

What is claimed is:

1. A crime prevention assisting apparatus comprising:
a control unit that judges whether or not a time belongs to a set time slot or a position acquired by positioning belongs to an area set in advance, and allows a call origination from a radio apparatus within a period in which either condition is met in response to a predetermined manipulation to the radio apparatus, wherein the predetermined manipulation is performed within the period.

2. The crime prevention assisting apparatus according to claim 1, further comprising a positioning section that determines a position of a local station, wherein said control unit acquires a position that is determined by said positioning section at a time when it requests said radio apparatus to make the call origination, and requests said radio apparatus to inform a party called byte call origination of the position.

3. The crime prevention assisting apparatus according to claim 1, further comprising a storing section storing therein in advance an identifier of said radio apparatus or of a subscriber and information representing a request for help, wherein said control unit requests said radio apparatus to send the information stored in said storing section to a party called by the call origination.

4. The crime prevention assisting apparatus according to claim 1, wherein said control unit requests said radio apparatus to send die acquired information to the called party as a mail.

5. The crime prevention assisting apparatus according to claim 1, wherein said control unit requests said radio apparatus to maintain, in a hands-free mode, a complete call that has occurred in response to the call origination.

6. A radio terminal apparatus that access a mobile communication network via a radio transmission path, the radio terminal apparatus comprising:

a control unit that judges whether or not a time belongs to a set time slot or a position acquired by positioning belongs to an area set in advance, and allows a call origination from said radio terminal apparatus within a period in which either condition is met in response to a predetermined manipulation to said terminal apparatus, wherein the predetermined manipulation is performed within the period.

7. The radio terminal apparatus according to claim 6, further comprising a positioning section that determines a position of a local station, wherein said control unit acquires the position that is determined by said positioning section when making the call origination, and informs a party called by the call origination of the position.

8. The radio terminal apparatus according to claim 6, further comprising:

a storing section storing therein in advance an identifier of a local station or of a subscriber and information representing a request for help, wherein said control unit sends the information stored in said storing section to a party called by the call origination.

9. The radio terminal apparatus according to claim 6, wherein said control unit sends the acquired information to the called party as a mail.

* * * * *